United States Patent
Kaneko et al.

(12) 
(10) Patent No.: US 6,323,847 B1
(45) Date of Patent: *Nov. 27, 2001

(54) CORRECTION OF VIEW-ANGLE-DEPENDENT CHARACTERISTICS FOR DISPLAY DEVICE

(75) Inventors: Yoshiya Kaneko; Tsutomu Kai; Hiroyuki Isogai, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,991

(22) Filed: Aug. 7, 1998

(30) Foreign Application Priority Data

Dec. 24, 1997 (JP) .................................... 9-355665

(51) Int. Cl.$^7$ ................................................ G09G 5/06
(52) U.S. Cl. .................... 345/204; 345/87; 345/94; 345/205; 345/206; 345/207
(58) Field of Search .................... 345/87, 94, 204, 345/205, 206, 207, 208

(56) References Cited

U.S. PATENT DOCUMENTS

| | | | |
|---|---|---|---|
| 5,774,099 | * | 6/1998 | Kiwasaki et al. ............ 345/87 |
| 5,940,058 | * | 8/1999 | Koyama ........................ 345/89 |
| 5,990,979 | * | 11/1999 | Koyama et al. ............ 348/674 |

FOREIGN PATENT DOCUMENTS

| | | |
|---|---|---|
| 7-248745 | 9/1995 | (JP) . |
| 7-248746 | 9/1995 | (JP) . |

* cited by examiner

Primary Examiner—Richard Hjerpe
Assistant Examiner—Jean Lesperance
(74) Attorney, Agent, or Firm—Grer, Burns & Crain, Ltd.

(57) ABSTRACT

A display device includes a display unit of a dot-matrix type, each pixel of which has view-angle-dependent characteristics. The display device further includes a correction circuit which corrects the view-angle-dependent characteristics by changing a voltage of a video signal with respect to every at least one horizontal scan period.

22 Claims, 15 Drawing Sheets

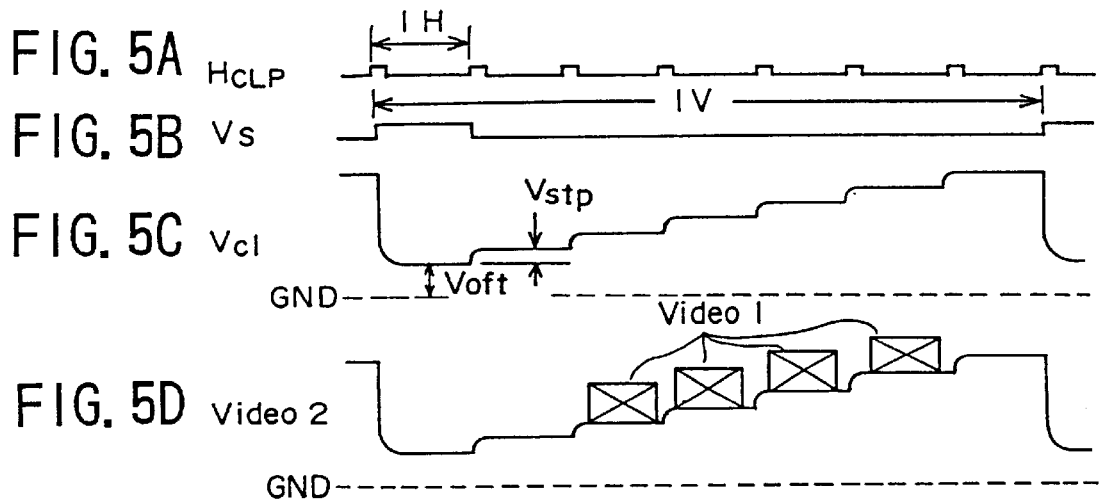
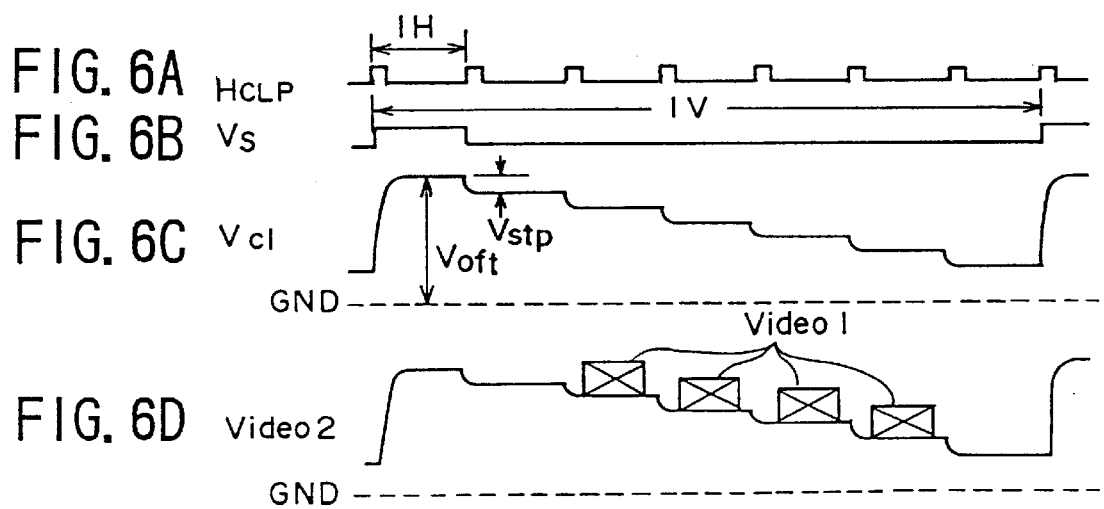

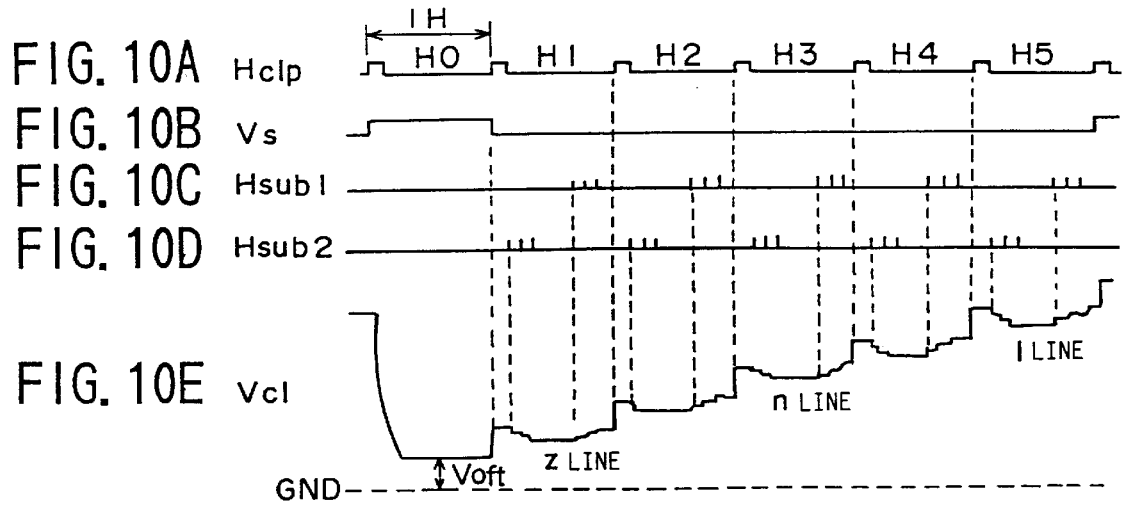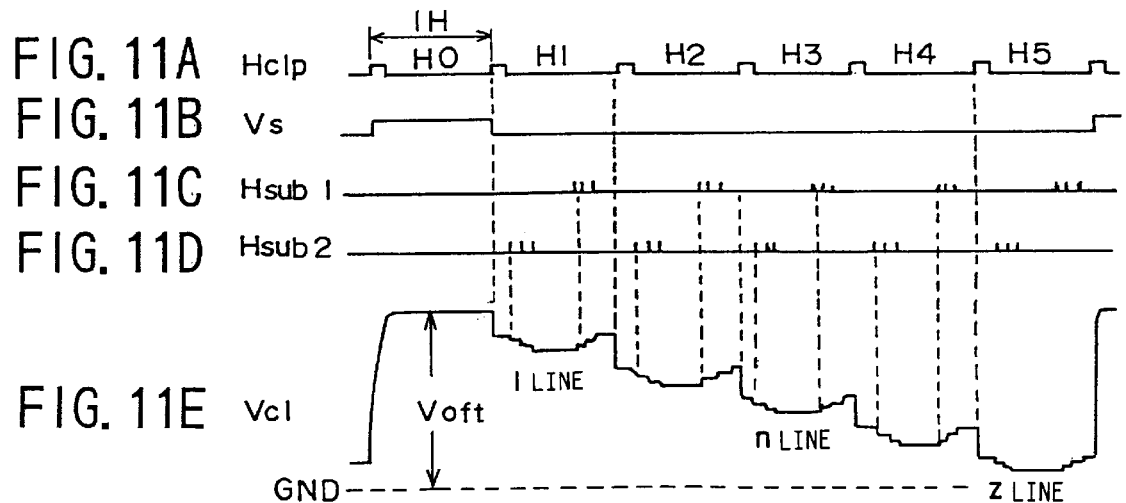

CORRECTION OF VIEW-ANGLE-DEPENDENT CHARACTERISTICS FOR DISPLAY DEVICE

BACKGROUND OF THE INVENTION

1. Field of the Invention

The present invention generally relates to liquid-crystal-display devices, and particularly relates to correction of view-angle-dependent characteristics of a liquid-crystal-display device.

2. Description of the Related Art

An LCD (liquid crystal display) has view-angle-dependent characteristics such that brightness of a pixel varies, depending on from which angle the pixel is viewed, even when a voltage applied to the pixel is kept constant. Because of this, an attempt to display the same brightness level over the whole display by applying the same voltage to all the pixels fails to accomplish an intended result. That is, the display shows different brightness at a different portion thereof since a view angle of an eye position relative to each pixel differs from pixel to pixel. Where full-color display requiring half-tone representation is employed, the view-angle-dependent characteristics are regarded as a main factor contributing to degradation of image quality when dark images are displayed.

FIGS. 1A through 1D are illustrative drawings showing T-V characteristics which depend on a view angle and relative positions between a liquid-crystal panel and an eye position. In FIGS. 1A and 1B, a vertical view angle with respect to a line L1 is shown as θu when an eye position VP provides a view over a liquid-crystal panel 500 having pixel lines L1, L2, . . . , and Ln, and a vertical view angle is represented as θd with respect to the line Ln at the bottom of the panel. The line Lm is situated at such a position that a view line extending from the eye position VP reaches this position at a right angle relative to the surface of the liquid-crystal panel 500. In FIGS. 1C and 1D, curves C1, Cm, and Cn show relations between a transparency ratio T and a applied voltage V when the line L1, Lm, and Ln, respectively, are viewed from the eye position VP.

As is apparent from FIG. 1C, the transparency ratio T when a pixel voltage Vb1 is applied differs with respect to each of the lines L1, Lm, and Ln. When the pixel voltage is changed to Vb2, an order of the brightness level is reversed between the line L1 and the line Lm, thereby making it hard to see the display. In order to achieve the same level t of the transparency ratio T, for example, different voltages should be applied as shown by Vc1, Vcm, and Vcn in FIG. 1D.

An attempt to improve view-angle-dependent characteristics of a liquid-crystal display has provided various schemes to date. An example of a mechanical scheme is to provide an adjustment mechanism for controlling an angle at which the liquid-crystal-display panel is placed, thereby allowing a user to set an appropriate angle. An example of an electrical scheme is to allow an adjustment to be made with regard to voltage levels applied to pixels such that a different range of the T-V characteristics (relations between the transparency ratio T and the applied voltage V) can be used. Related-art adjustment schemes, however, have various problems. For example, brighter portions may saturate when an attempt is made to improve image quality of darker portions. Also, appropriate correction cannot be made concurrently to the entirety of the display. Further, a circuit size tends to become undesirably bigger.

Accordingly, there is a need for a liquid-crystal display which can provide a high-quality image by using a simple circuit structure.

SUMMARY OF THE INVENTION

Accordingly, it is a general object of the present invention to provide a semiconductor memory device which can satisfy the need described above.

It is another and more specific object of the present invention to provide a liquid-crystal display which can provide a high-quality image by using a simple circuit structure.

In order to achieve the above objects, a display device according to the present invention includes a display unit of a dot-matrix type, each pixel of which has view-angle-dependent characteristics. The display device further includes a correction circuit which corrects the view-angle-dependent characteristics by changing a voltage of a video signal with respect to every at least one horizontal scan period.

According to one aspect of the present invention, the display device described above is such that the display unit is a liquid-crystal-display unit of a direct-view type.

According to another aspect of the present invention, the display device is such that the display unit is a liquid-crystal-display unit of a projection type.

According to another aspect of the present invention, the display device is such that the correction circuit includes a clamp-voltage-control circuit which generates a clamp voltage showing a step voltage change by a predetermined voltage level with respect to the every at least one horizontal scan period by starting from an initial voltage at a beginning of a vertical scan period, and a clamp circuit which clamps the video signal to the clamp voltage.

According to another aspect of the present invention, the display device is such that the clamp-voltage-control circuit generates the clamp voltage showing a step voltage increase as the step voltage change.

According to another aspect of the present invention, the display device is such that the clamp-voltage-control circuit generates the clamp voltage showing a step voltage decrease as the step voltage change.

According to another aspect of the present invention, the display device is such that the clamp-voltage-control circuit includes a capacitor and a circuit which controls a voltage charged in the capacitor based on vertical-synchronization pulses and horizontal-synchronization pulses, wherein the clamp voltage is generated in accordance with the voltage charged in the capacitor.

According to another aspect of the present invention, the display device is such that the clamp-voltage-control circuit changes the clamp voltage within a horizontal scan period so as to correct the view-angle-dependent characteristics in terms of a horizontal-scan direction of the display unit.

According to another aspect of the present invention, the display device is such that the clamp-voltage-control circuit generates the clamp voltage such that the clamp voltage shows the step-voltage change with respect to the every at least one horizontal scan period as long as the every at least one horizontal scan period is one of a predetermined set of horizontal scan periods among all horizontal scan periods defining one cycle of the vertical scan period.

According to another aspect of the present invention, the display device is such that the correction circuit further includes an amplitude adjustment circuit which adjusts an amplitude of the video signal according to the clamp voltage.

According to another aspect of the present invention, the display device is such that the correction circuit further includes setting unit for allowing a manual setting to be made with respect to the initial voltage and the predetermined voltage level.

According to another aspect of the present invention, a correction circuit for correcting view-angle-dependent characteristics of a dot-matrix-type display unit includes a clamp-voltage-control circuit generating a clamp voltage which changes a voltage level thereof with respect to every at least one horizontal scan period, and a clamp circuit which clamps a video signal to the clamp voltage.

According to another aspect of the present invention, the correction circuit described above is such that the clamp-voltage-control circuit generates the clamp voltage such that the clamp voltage shows a step voltage increase by a predetermined voltage level with respect to the every at least one horizontal scan period by starting from an initial voltage at a beginning of a vertical scan period.

According to another aspect of the present invention, the correction circuit is such that the clamp-voltage-control circuit generates the clamp voltage such that the clamp voltage shows a step voltage decrease by a predetermined voltage level with respect to the every at least one horizontal scan period by starting from an initial voltage at a beginning of a vertical scan period.

According to another aspect of the present invention, the correction circuit is such that the clamp-voltage-control circuit includes a capacitor and a circuit which controls a voltage charged in the capacitor based on vertical-synchronization pulses and horizontal-synchronization pulses, wherein the clamp voltage is generated in accordance with the voltage charged in the capacitor.

According to another aspect of the present invention, the circuit is such that the clamp-voltage-control circuit changes the clamp voltage within a horizontal scan period so as to correct the view-angle-dependent characteristics in terms of a horizontal-scan direction of the display unit.

According to another aspect of the present invention, the correction circuit further includes an amplitude adjustment circuit which adjusts an amplitude of the video signal according to the clamp voltage.

According to another aspect of the present invention, a method of correcting view-angle-dependent characteristics of a dot-matrix-type display unit includes the steps of a) generating a clamp voltage which changes a voltage level thereof with respect to every at least one horizontal scan period, b) clamping a video signal to the clamp voltage, and c) displaying the video signal clamped to the clamp voltage to the dot-matrix-type display unit.

According to another aspect of the present invention, the method described above is such that the step a) includes the steps of setting the clamp voltage to an initial voltage at a beginning of a vertical scan period, and increasing the clamp voltage by a step of the predetermined voltage level with respect to the every at least one horizontal scan period.

According to another aspect of the present invention, the method is such that the step a) includes the steps of setting the clamp voltage to an initial voltage at a beginning of a vertical scan period, and decreasing the clamp voltage by a step of the predetermined voltage level with respect to the every at least one horizontal scan period.

According to another aspect of the present invention, the method is such that the step a) includes a step of changing the clamp voltage within a horizontal scan period so as to correct the view-angle-dependent characteristics in terms of a horizontal-scan direction of the dot-matrix-type display unit.

According to another aspect of the present invention, the method further includes a step of adjusting an amplitude of the video signal according to the clamp voltage.

In the present invention described above, the voltage of the video signal is increased or decreased with respect to every at least one horizontal scan period, e.g., with respect to every horizontal scan period, thereby correcting the view-angle-dependent characteristics of the display unit. Since the voltage of the video signal is changed from a given horizontal scan period to the next horizontal scan period within a vertical scan period, the view-angle-dependent characteristics are corrected in a vertical direction of the display unit (i.e., in a vertical scan direction).

In detail, the clamp voltage is generated such that it exhibits a step increase or decrease of a predetermined voltage level with respect to every horizontal scan period, for example, and the voltage of the video signal is clamped to the clamp voltage. A relatively simple circuit can readily generate such a clamp voltage by controlling a voltage charged in a capacitor (i.e., by controlling electrical charge) based on the horizontal synchronization pulses and the vertical synchronization pulses.

Further, the clamp voltage may be changed within some of the horizontal scan periods, thereby correcting the view-angle-dependent characteristics of the display unit in terms of a horizontal direction (horizontal scan direction).

Further, the correction of the view-angle-dependent characteristics may be made only with respect to a set of some horizontal scan lines among all the horizontal scan lines of the vertical scan period.

Moreover, an amplitude of the video signal may be adjusted in accordance with a magnitude of the clamp voltage, thereby avoiding a saturation of the half-tone levels on one side of the video-signal levels.

Moreover, a mechanism for manual adjustment of an initial voltage and an amount of the step increase/decrease may be provided, so that a user can adjust the view-angle-dependent characteristics in accordance with a distance and an angle at which the user views the display unit.

Other objects and further features of the present invention will be apparent from the following detailed description when read in conjunction with the accompanying drawings.

BRIEF DESCRIPTION OF THE DRAWINGS

FIGS. 5A though 5D are signal charts showing a clamp voltage generated by a clamp-voltage-control circuit and a video signal output from a clamp circuit;

FIGS. 6A though 6D are also signal charts showing a clamp voltage generated by the clamp-voltage-control circuit and a video signal output from the clamp circuit;

FIGS. 10A through 10E are signal charts showing operations of the clamp-voltage-control circuit of FIG. 9;

FIGS. 11A through 11E are also signal charts showing operations of the clamp-voltage-control circuit of FIG. 9;

FIG. 18 is a circuit diagram showing a circuit which generates half-tone voltages based on the clamp voltage in a data driver or the like.

DESCRIPTION OF THE PREFERRED EMBODIMENTS

In the following, a principle and embodiments of the present invention will be described with reference to the accompanying drawings.

Figure 2:
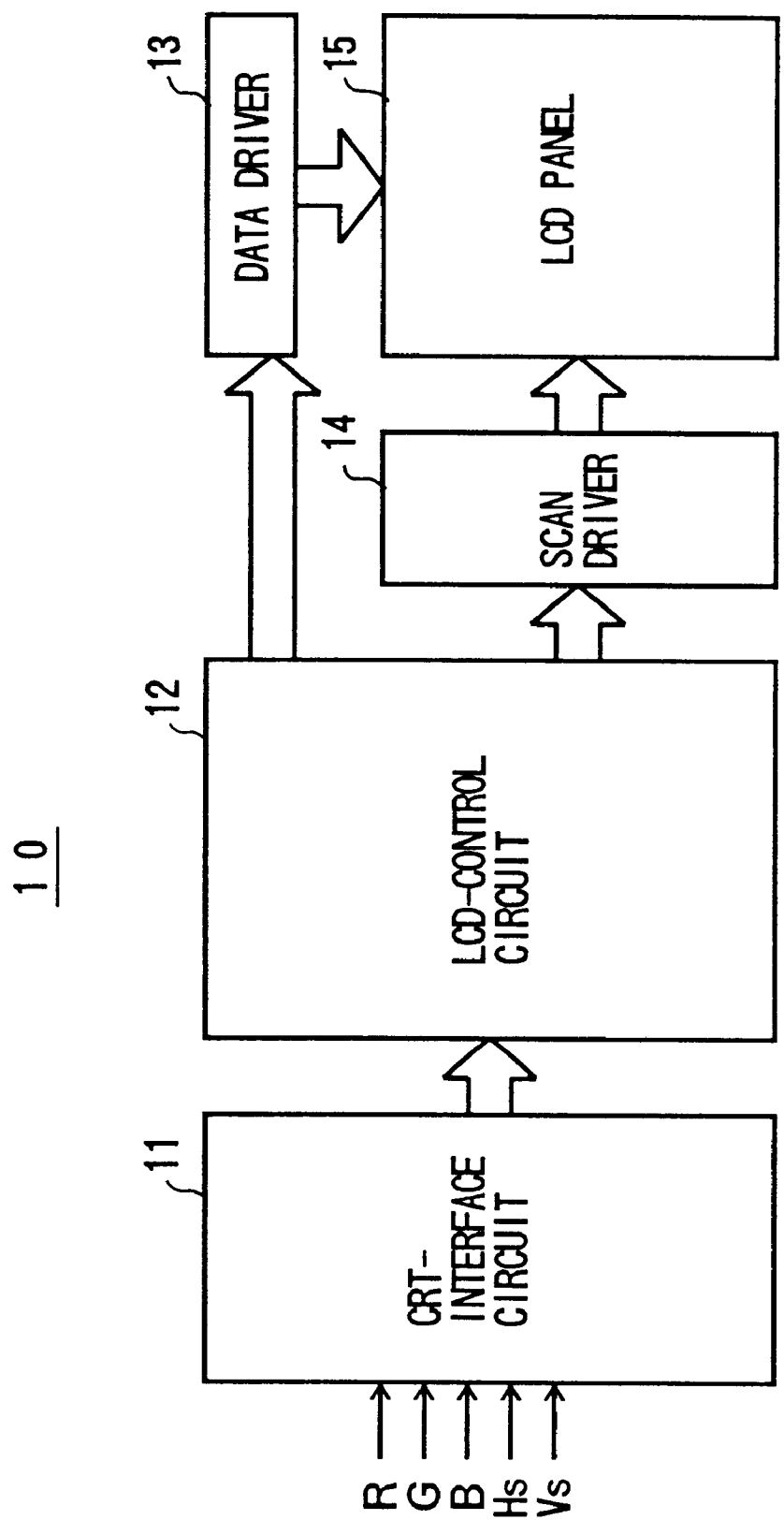
FIG. 2 is a block diagram of a liquid-crystal-display device according to the present invention.

FIG. 2 is a block diagram of a liquid-crystal-display device according to the present invention.

A liquid-crystal-display device 10 of FIG. 2 includes a CRT-interface circuit 11, an LCD-control circuit 12, a data driver 13, a scan driver 14, and an LCD panel 15.

The CRT-interface circuit 11 receives video signals R, G, B, horizontal synchronization pulses Hs, and vertical synchronization pulses Vs from a personal computer or a video-output device. These signals are adapted to use in CRT, and are supplied to the LCD-control circuit 12. The LCD-control circuit 12 converts the video signals for CRT into video signals for liquid-crystal display, and supplies the converted signals to the data driver 13. Further, the LCD-control circuit 12 provides control signals to the data driver 13 and the scan driver 14, where these signals are used for the purpose of controlling video display and scanning. The data driver 13 and the scan driver 14 drive the LCD panel 15 to display the video signals.

The LCD panel 15 is a display device of a dot-matrix type, each pixel of which has view-angle-dependent characteristics. The liquid-crystal-display device 10 may be a device which a user watches directly, or may be a projection device which projects light passing through the LCD panel 15 onto a screen so that a user can watch a video image on the screen. Where a color-display scheme is employed, a set of the data driver 13, the scan driver 14, and the LCD panel 15 may be provided with respect to each of the three primal colors R, G, and B.

Figure 3A:
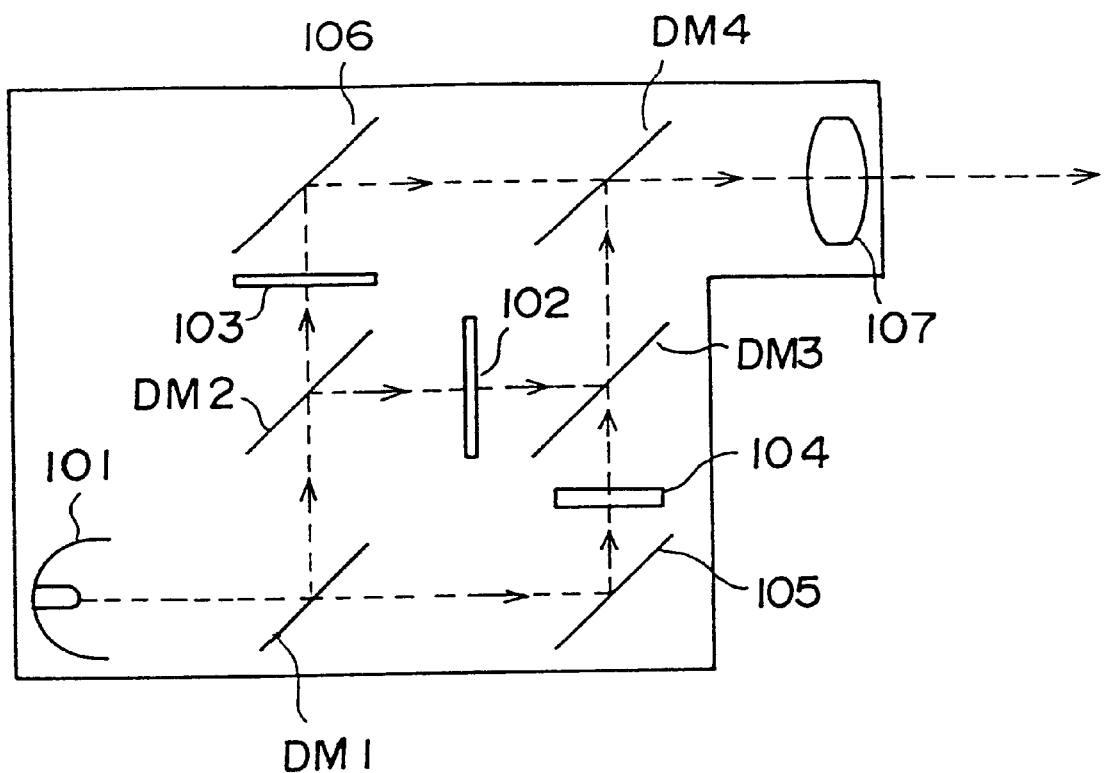
FIGS. 3A and 3B are illustrative drawings showing configurations of a projection device and a direct-view device, respectively.
Figure 3B:
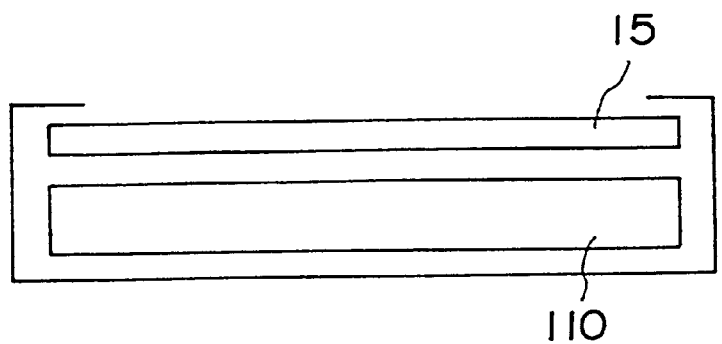

FIGS. 3A and 3B are illustrative drawings showing configurations of a projection device and a direct-view device, respectively.

The projection device of FIG. 3A includes a light source 101, a R panel 102, a G panel 103, a B panel 104, mirrors 105 and 106, a projection lens 107, and mirrors DM1 through DM4. In this configuration, light emitted from the light source 101 is separated into three routes, and light on each route passes through a respective one of the R panel 102, the G panel 103, and the B panel 104 before being combined together and projected via the projection lens 107. In the direct-view device shown in FIG. 3B, light emitted form the light source (back-light unit) 110 passes through the LCD panel 15, and reaches the user for a direct view.

Figure 4:
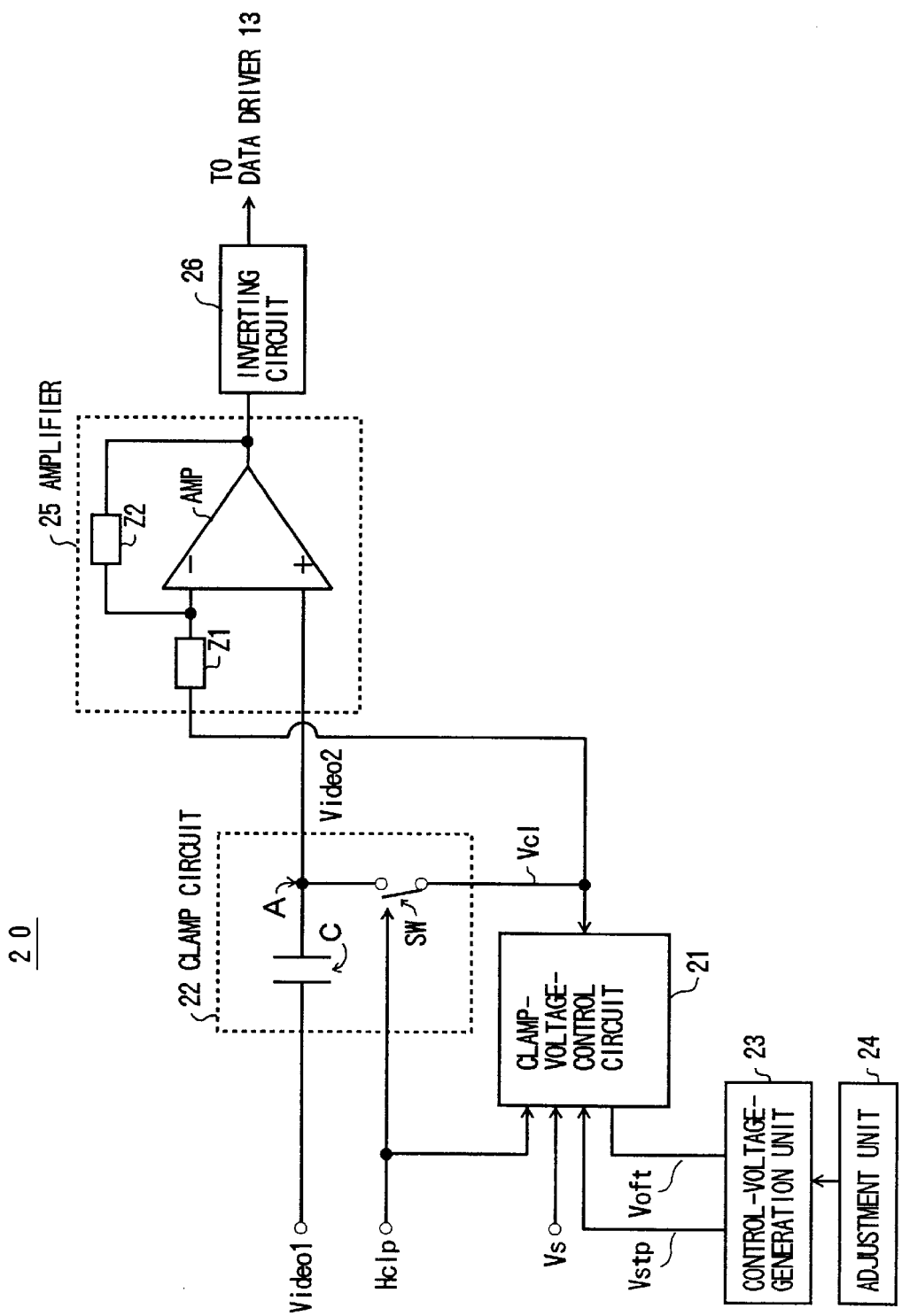
FIG. 4 is an illustrative drawing showing a configuration of a video-signal circuit which supplies video signals to a data driver from a LCD-control circuit shown in FIG. 2.

FIG. 4 is an illustrative drawing showing a configuration of a video-signal circuit which supplies video signals to the data driver 13 from the LCD-control circuit 12 shown in FIG. 2.

A video-signal circuit 20 of FIG. 4 includes a clamp-voltage-control circuit 21, a clamp circuit 22, a control-voltage-generation unit 23, an adjustment unit 24, an amplifier 25, and an inverting circuit 26. The clamp circuit 22 includes a capacitor C and a switch SW. The amplifier 25 includes a differential amplifier AMP and loads Z1 and Z2.

A video signal Video1 is clamped to a clamp voltage Vcl by the clamp circuit 22. Namely, a voltage level of the video signal Video1 is added to the clamp voltage Vcl, where the clamp voltage Vcl may represent a black-color level, for example. A video signal Video2, which has the clamp voltage Vcl as an underlying voltage, is amplified by the amplifier 25. The video signal Video2 after the amplification is processed by the inverting circuit 26, and is converted into a signal which switches between a positive video signal and a negative video signal in turn around a center voltage. This converted signal is used for driving the LCD panel 15 through an alternate-current driving scheme. The output of the inverting circuit 26 is supplied to the data driver 13 of FIG. 2. The inverting circuit 26 has a configuration which is well within the scope of prior art, and a description thereof will be omitted.

In the clamp circuit 22, the switch SW is turned on only during an active period of a pulse when the pulse is supplied as one of the clamp pulses Hclp having the same timing as the horizontal synchronization pulses Hs. When this happens, the video signal Video1 is not provided. As the switch SW is turned on, the clamp voltage Vcl is stored as electric charge in the capacitor C, so that a node A ends up having the clamp voltage Vcl. The switch SW is then turned off, and the video signal Video1 is supplied. When this happens, a signal which is a sum of the video signal Video1 and the clamp voltage Vcl appears at the node A. The signal appearing at the node A is supplied from the clamp circuit 22 as the video signal Video2.

The clamp voltage Vcl is generated by the clamp-voltage-control circuit 21. The clamp-voltage-control circuit 21 controls the clamp voltage Vcl such that the clamp voltage Vcl is equal to an offset voltage Voft at a timing indicated by the vertical synchronization pulse Vs, and increases (or decreases) from the offset voltage Voft by a step voltage Vstp each time the clamp pulse Hclp is supplied. The offset voltage Voft and the step voltage Vstp are generated by the control-voltage-generation unit 23, and are adjustable by using the adjustment unit 24.

FIGS. 5A though 5D are signal charts showing the clamp voltage Vcl generated by the clamp-voltage-control circuit 21 and the video signal Video2 output from the clamp circuit 22. FIGS. 6A though 6D are also signal charts showing the clamp voltage Vcl generated by the clamp-voltage-control circuit 21 and the video signal Video2 output from the clamp circuit 22.

FIGS. 5A through 5D show a case in which the clamp voltage Vcl starts from the offset voltage Voft, and increases by the step voltage Vstp at each step.

FIGS. 6A through 6D show a case in which the clamp voltage Vcl starts from the offset voltage Voft, and decreases by the step voltage Vstp at each step.

In FIGS. 5A through 5D, the video signal Video2 increases by the step voltage Vstp each time the clamp pulse Hclp supplied, reflecting the step increases of the clamp voltage Vcl. In FIGS. 6A through 6D, the video signal Video2 decreases by the step voltage Vstp each time the clamp pulse Hclp supplied, reflecting the step decreases of the clamp voltage Vcl. As shown in the figures, the video signal Video2 is a sum of the clamp voltage Vcl and the video signal Video1.

Where scan is successively performed from the top line to the bottom line in the LCD panel 15 of FIG. 2, the video signal Video2 as shown in FIGS. 6A through 6D is used. In general, the liquid-crystal-display device is designed such that scan can be conducted from the bottom line to the top line. In such a case, the video signal Video2 as shown in FIGS. 5A through 5D is employed.

Figure 1A:
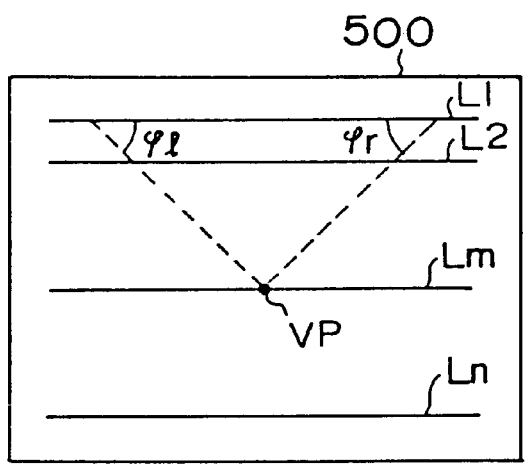
FIGS. 1A through 1D are illustrative drawings showing T-V characteristics which depend on a view angle and relative positions between a liquid-crystal panel and an eye position.
Figure 1B:
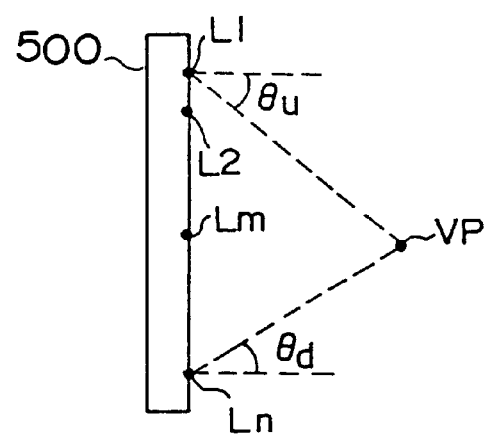
Figure 1C:
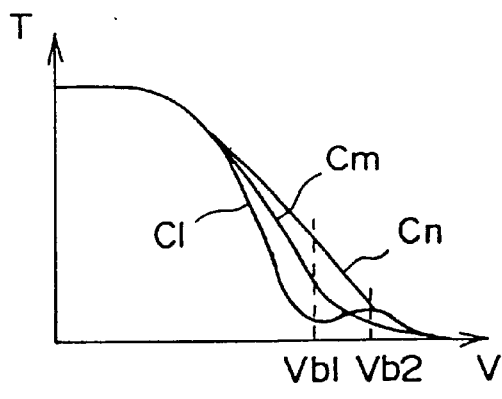
Figure 1D:
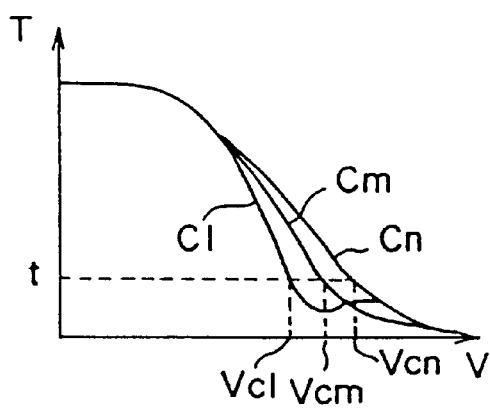

As is apparent from FIGS. 1A through 1D, when the top line L1, the line Lm, and the bottom line Ln are viewed from the eye position VP, applied voltage should be increased from the line L1 to the line Lm and from the line Lm to the line Ln in order to achieve the same transparency ratio T. That is, the voltages Vc1, Vcm, and Vcn as shown in FIG. 1D should be applied. This achieves an appropriate correction of the view-angle-dependent characteristics in terms of a θ direction. In light of this when the video signals are to be displayed on the LCD panel 15, a video signal voltage applied to each line needs to be increased once in each horizontal synchronization so as to provide a desirable display of the video signals. The video-signal circuit of FIG. 4 can generate such video signals having step increases based on a simple circuit structure.

In the above description, FIGS. 5A through 5D and FIGS. 6A through 6D were provided to show cases where the clamp voltage Vcl experiences a step increase or decrease once in each horizontal synchronization period. For the purpose of correcting the view-angle-dependent characteristics, however, the clamp voltage Vcl may show a step increase or decrease once in more than one horizontal synchronization period such as once in two horizontal synchronization periods. It is apparent that such a configuration can provide the same correction effect. Further, the clamp voltage Vcl does not necessarily have to be changed at equal intervals. For example, the clamp voltage Vcl may be changed at an end of two horizontal synchronization periods after a previous change, and, then, may be changed at an end of one horizontal synchronization period after this change. Further, a next change may be made at an end of two horizontal synchronization periods again. It is apparent that such a configuration is also permissible.

Figure 7:
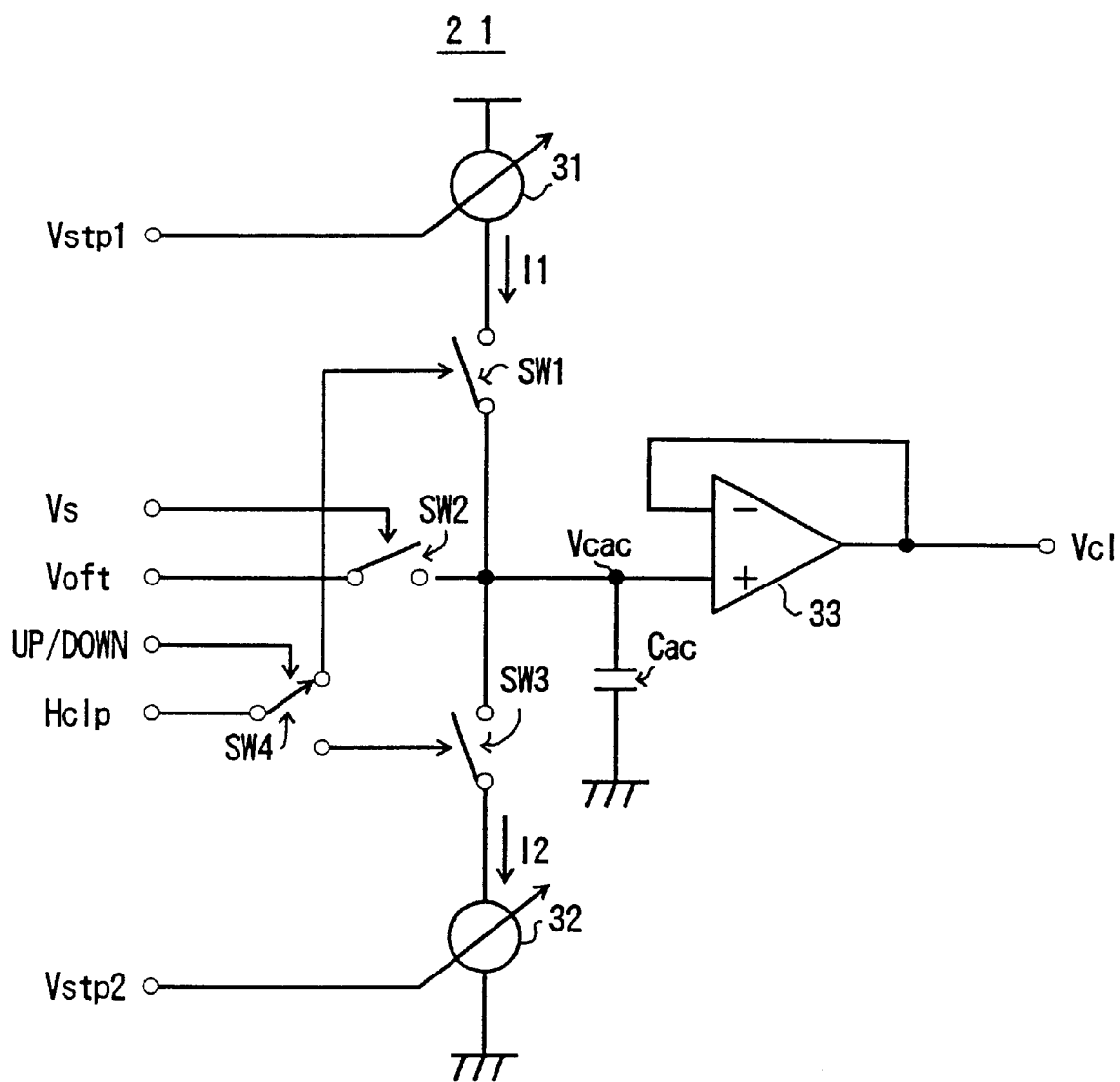
FIG. 7 is a circuit diagram of a first embodiment of the clamp-voltage-control circuit.

FIG. 7 is a circuit diagram of a first embodiment of the clamp-voltage-control circuit 21.

The clamp-voltage-control circuit 21 of FIG. 7 includes a current supply 31, a current supply 32, a differential amplifier 33, switches SW1 through SW4, and a capacitor Cac.

In FIG. 7, the switch SW4 is controlled by a direction indicating signal UP/DOWM, and supplies the clamp pulse Hclp to either one of the switch SW1 and the switch SW3. When the clamp pulse Hclp is supplied to the switch SW1, operations shown in FIGS. 5A through 5D are performed. On the other hand, when the clamp pulse Hclp is supplied to the switch SW3, operations shown in FIGS. 6A through 6D are conducted.

As the vertical synchronization pulse Vs becomes active, the switch SW2 is turned on during the active period thereof. This results in the capacitor Cac being charged up to the offset voltage Voft.

When the clamp pulse Hclp is supplied to the switch SW1, the switch SW1 is turned on only during an active period of the clamp pulse Hclp. As the switch SW1 is turned on, a current I1 from the current supply 31 is supplied to the capacitor Cac to charge it only during the active period of the clamp pulse Hclp. Here, the current I1 has a current amount which is controlled by the step voltage Vstp1. In this manner, the voltage Vcac charged in the capacitor Cac shows a step increase equal to the step voltage Vstp once in each horizontal synchronization period by starting from an initial voltage of the offset voltage Voft.

When the clamp pulse Hclp is supplied to the switch SW3, the switch SW3 is turned on only during an active period of the clamp pulse Hclp. As the switch SW3 is turned on, a current I2 driven by the current supply 32 is drained from the capacitor Cac to discharge it only during the active period of the clamp pulse Hclp. Here, the current I2 has a current amount which is controlled by the step voltage Vstp2. In this manner, the voltage Vcac charged in the capacitor Cac shows a step decrease equal to the step voltage Vstp once in each horizontal synchronization period by starting from an initial voltage of the offset voltage Voft.

Figure 8:
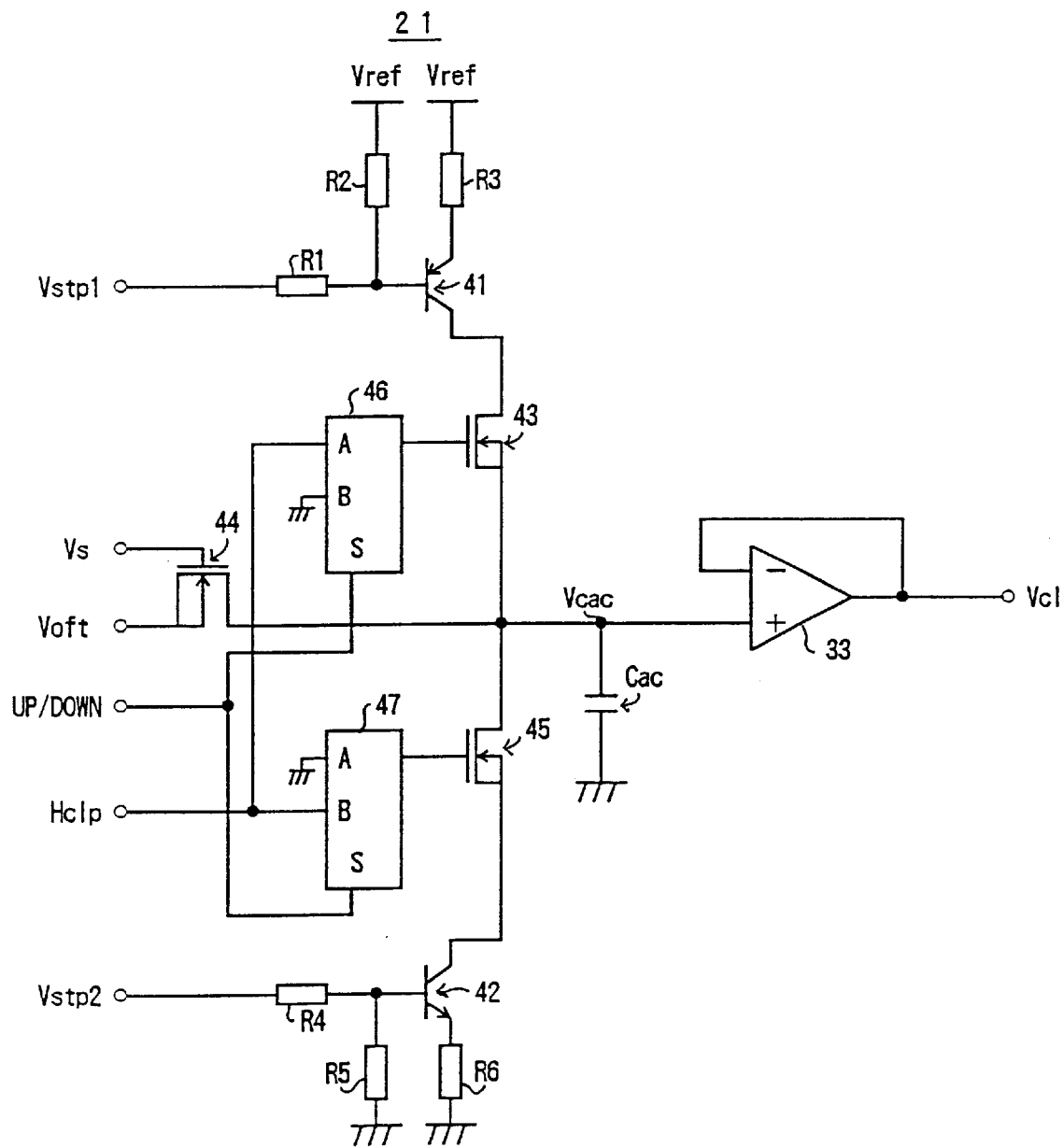
FIG. 8 is a circuit diagram showing an example of a detailed circuit configuration of the clamp-voltage-control circuit shown in FIG. 7.

FIG. 8 is a circuit diagram showing an example of a detailed circuit configuration of the clamp-voltage-control circuit 21 shown in FIG. 7.

The clamp-voltage-control circuit 21 of FIG. 8 includes transistors 41 and 42, NMOS transistors 43 through 45, multiplexers 46 and 47, resistors R1 through R6, and the differential amplifier 33. The transistor 41 and the resistors R1 through R3 together form the current supply 31 of FIG. 7, and the transistor 42 and the resistors R4 through R6 together make up the current supply 32 shown in FIG. 7. The NMOS transistors 43 through 45 correspond to the switches SW1 through SW3 of FIG. 7, respectively. Each of the multiplexers 46 and 47 selects an A input when an S input is HIGH, and selects a B input when the S input is LOW. The multiplexers 46 and 47 correspond to the switch SW4 of FIG. 7. As shown in this example, use of conventional circuit elements readily achieves an implementation of the clamp-voltage-control circuit 21 shown in FIG. 7.

Figure 9:
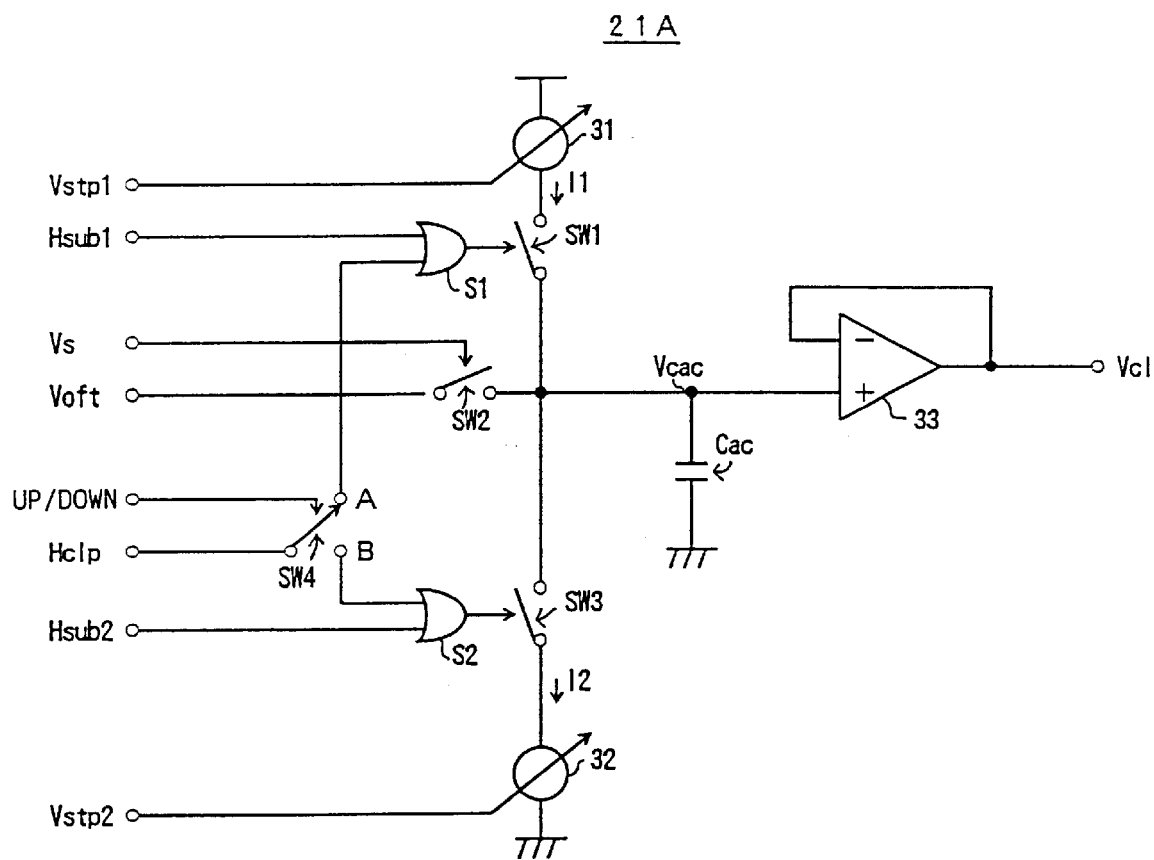
FIG. 9 is a circuit diagram of a second embodiment of the clamp-voltage-control circuit.

FIG. 9 is a circuit diagram of a second embodiment of a clamp-voltage-control circuit. FIGS. 10A through 10E are signal charts showing operations of the clamp-voltage-control circuit of FIG. 9. FIGS. 11A through 11E are also signal charts showing operations of the clamp-voltage-control circuit of FIG. 9.

The clamp-voltage-control circuit 21A of FIG. 9 includes the current supply 31, the current supply 32, the differential amplifier 33, the switches SW1 through SW4, the capacitor Cac, and OR circuits 51 and 52. The clamp-voltage-control circuit 21A of FIG. 9 has the OR circuits 51 and 52 newly provided in addition to the configuration of the clamp-voltage-control circuit 21 shown in FIG. 7.

The OR circuit 51 supplies clamp sub-pulses Hsub1 as well as the clamp pulses Hclp to the switch SW1. The OR circuit 52 supplies clamp sub-pulses Hsub2 in addition to the clamp pulses Hclp to the switch SW3. The clamp sub-pulses Hsub1 and Hsub2 are inserted into each line (1H) at predetermined locations between horizontal-synchronization pulses, as shown in FIGS. 10A through 10E and FIGS. 11A through 11E. The clamp sub-pulses Hsub1 increase the clamp voltage Vcl in a step-wise manner by a predetermined voltage, and the clamp sub-pulses Hsub2 decrease the clamp voltage Vcl by a predetermined voltage step. In this manner, as shown in the figures, the clamp voltage Vcl is formed within each horizontal line (1H) such that the clamp voltage Vcl exhibits step declines to reach a bottom at a center of the line, and shows step rises thereafter. The amount of a voltage decrease or a voltage increase at each step can be controlled by pulse widths of the clamp sub-pulses Hsub1 and the clamp sub-pulses Hsub2.

Use of the clamp voltage Vcl showing such voltage changes within each 1H period as described above makes it possible to correct the view-angle-dependent characteristics with regard to a ø direction shown in FIG. 1A. Namely, the clamp-voltage-control circuit 21A of FIG. 9 can correct the view-angle-dependent characteristics not only with regard to the vertical direction but also with regard to the horizontal direction, thereby providing a desirable image display.

In FIG. 9, the clamp sub-pulses Hsub1 and Hsub2 do not necessarily have to be inserted into each 1H. Depending on a position of a given pixel line within the liquid-crystal display, the given pixel line may not exhibit significant view-angle-dependent characteristics in the horizontal direction. In such a case, therefore, the clamp sub-pulses Hsub1 and Hsub2 may not be inserted.

Figure 12:
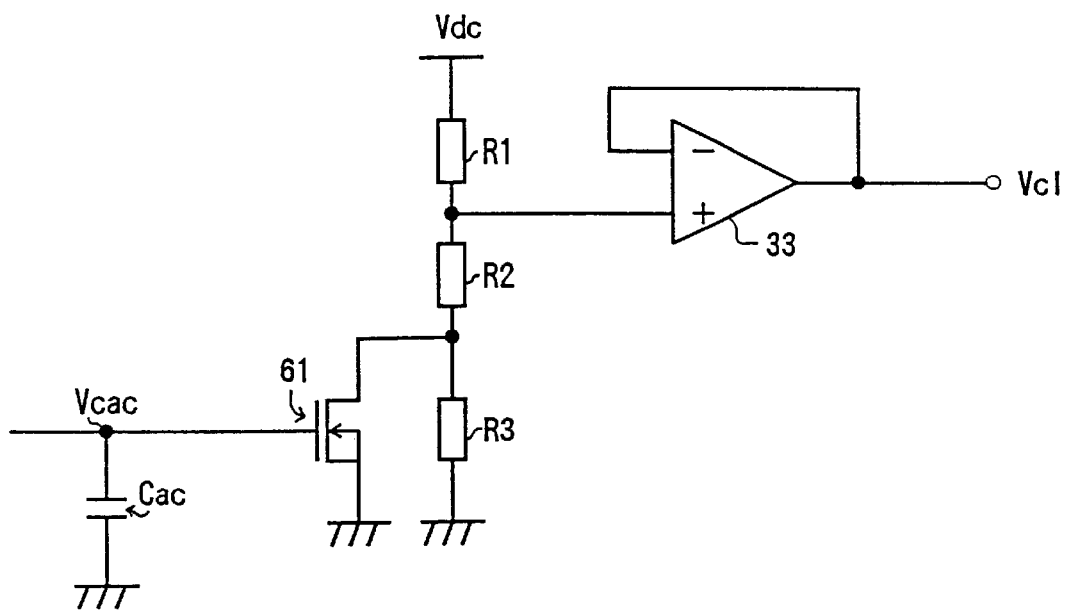
FIG. 12 is a circuit diagram of a third embodiment of the clamp-voltage-control circuit.
Figure 13A:
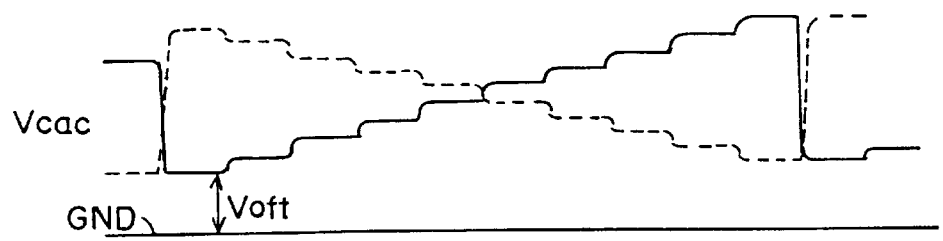
FIGS. 13A and 13B are illustrative drawings for explaining operations of the clamp-voltage-control circuit of FIG. 12.
Figure 13B:
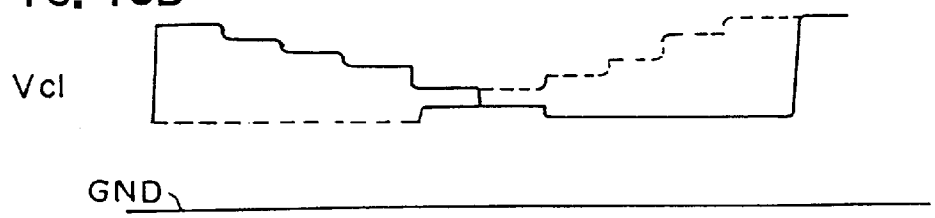

FIG. 12 is a circuit diagram of a third embodiment of a clamp-voltage-control circuit. FIGS. 13A and 13B are illustrative drawings for explaining operations of the clamp-voltage-control circuit of FIG. 12.

The third embodiment shown in FIG. 12 is a variation of the first embodiment shown in FIG. 7 or the second embodiment shown in FIG. 9. In the first and second embodiments, the differential amplifier 33 directly receives the voltage Vcac charged in the capacitor Cac. In contrast, the third embodiment provides a circuit comprised of registers R1 through R3 and an NMOS transistor 61, and the voltage Vcac is supplied via this circuit to the differential amplifier 33.

The voltage Vcac charged in the capacitor Cac is input to a gate of the NMOS transistor 61. While the voltage Vcac stays at a voltage lower than a threshold voltage of the NMOS transistor 61, the NMOS transistor 61 is not turned on. In this case, the differential amplifier 33 is provided with a constant voltage obtained by dividing a voltage Vdc via a series of resistors R1, R2, and R3. Here, the voltage Vdc is the center voltage, as previously described, around which the positive video signal and the negative video signal are switched in turn when the inverting circuit 26 of FIG. 4 processes the video signal.

As the voltage Vcac exceeds the threshold voltage of the NMOS transistor 61, the NMOS transistor 61 is turned on. In this case, a series of resistors is formed by the resistors R1 and R2 and a resistance obtained by a parallel connection of the resistor R3 and a drain-source resistance of the NMOS transistor 61. Because of this, the differential amplifier 33 receives a voltage obtained by dividing the voltage Vdc in accordance with the voltage Vcac.

Accordingly, the clamp voltage Vcl output from the clamp-voltage-control circuit will have a signal form as shown in FIG. 13B, reflecting changes in the voltage Vcac (FIG. 13A) charged in the capacitor Cac. As shown in the figures, the circuit configuration of FIG. 12 changes the voltage Vcac, which exhibits step increases or decreases, into the clamp voltage Vcl that keeps a constant voltage level as long as the voltage Vcac is lower than a predetermined voltage (i.e., the threshold voltage of the NMOS transistor 61). Namely, correction of the view-angle-dependent characteristics is attended to only with respect to some of the horizontal lines among the total number of horizontal lines provided within a 1V period of the video signal. These horizontal lines subjected to the correction correspond to a predetermined number of adjacent lines starting from the first line or to a predetermined number of adjacent lines ending at the last line.

Since the initial voltage of the clamp voltage Vcl is provided as the offset voltage Voft, a change in the offset voltage Voft makes it possible to adjust a position where the clamp voltage Vcl starts increasing or where the clamp voltage Vcl stops decreasing. In this manner, an adjustment can be readily made with regard to how many number of horizontal lines from the first line or how many number of horizontal lines ending at the last line can be subjected to the correction of the view-angle-dependent characteristics among all the horizontal lines provided within the 1V period of the video signal. Further, the correction may be applied only to those lines where an order of brightness is reversed as shown in FIG. 1C.

Figure 14:
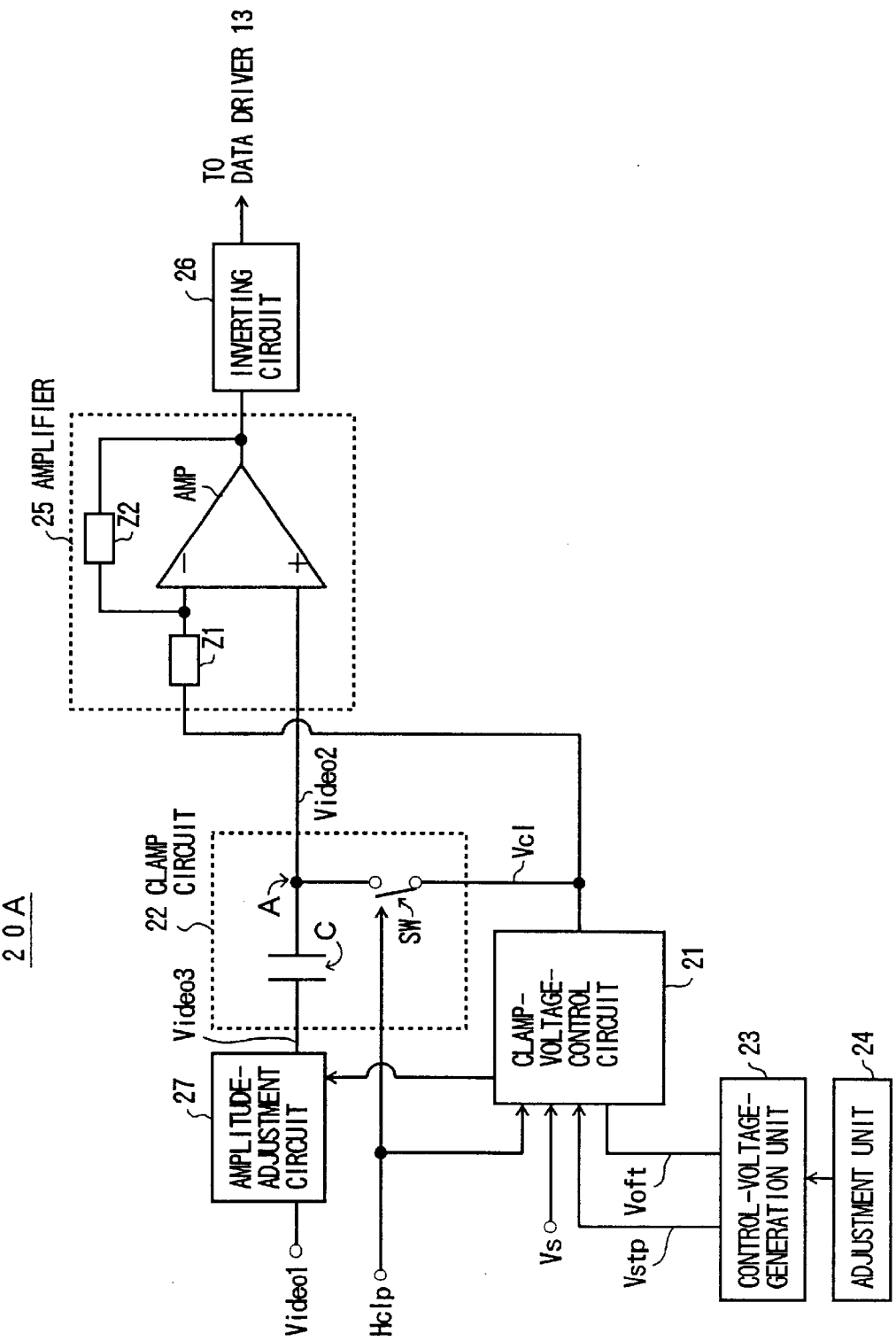
FIG. 14 is an illustrative drawing showing a variation of the video-signal circuit shown in FIG. 4.
Figure 15:
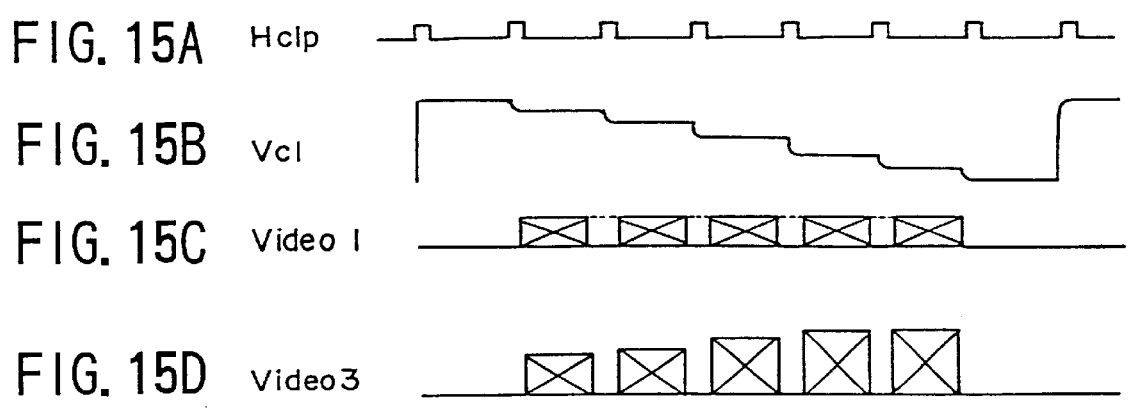
FIGS. 15A through 15D are signal charts for explaining operations of an amplitude-adjustment circuit of FIG. 14.

FIG. 14 is an illustrative drawing showing a variation of the video-signal circuit shown in FIG. 4.

A video-signal circuit 20A of FIG. 14 is provided with an amplitude-adjustment circuit 27 in addition to the configuration of the video-signal circuit 20 shown in FIG. 4, so that an adjustment can be made to the amplitude of the video signal Video1. The amplitude-adjustment circuit 27 receives the voltage Vcac or the clamp voltage Vcl from the clamp-voltage-control circuit 21, and adjusts the amplitude of the video signal Video1 in accordance with the supplied voltage.

FIGS. 15A through 15D are signal charts for explaining operations of the amplitude-adjustment circuit 27 of FIG. 14.

As shown in FIGS. 15A through 15D, the video signal Video1 is subjected to an amplitude adjustment so as to become a video signal Video3 in accordance with the magnitude of the clamp voltage Vcl (or the voltage Vcac). In this amplitude adjustment, the amplitude-adjustment circuit 27 is controlled such that the greater the voltage of the clamp voltage Vcl, the smaller the amplitude of the video signal Video3. This can prevent the white color of the video signal from saturating at a portion of the T-V characteristics where the transparency ratio T is high when the clamp voltage Vcl is high. Namely, undesirable saturation of the white tones in the displayed video image can be avoided.

A configuration of the amplitude-adjustment circuit 27 is well within the scope of ordinary skill in the art, and a description thereof will be omitted. It should be noted that the clamp-voltage-control circuit 21 shown in FIG. 14 may be replaced by the clamp-voltage-control circuit 21A of the second embodiment or the clamp-voltage-control circuit to which the third embodiment is applied.

Figure 16:
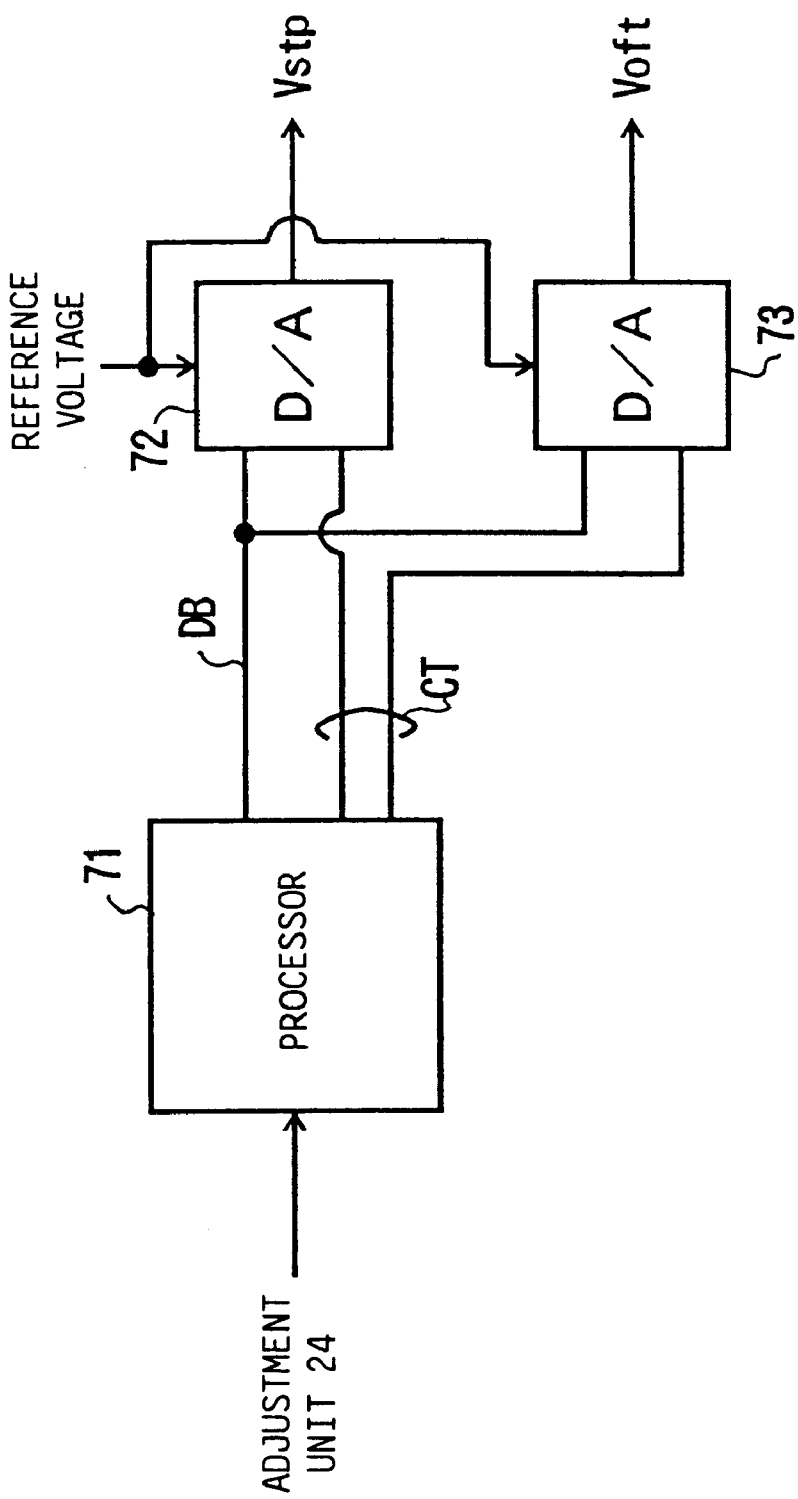
FIG. 16 is a block diagram of an embodiment of a control-voltage-generation unit shown in FIG. 4.

FIG. 16 is a block diagram of an embodiment of the control-voltage-generation unit 23 shown in FIG. 4.

The control-voltage-generation unit 23 of FIG. 16 includes a processor 71 and D/A converters 72 and 73. The processor 71 supplies data regarding particulars of the step voltage Vstp and the offset voltage Voft to the D/A converters 72 and 73 via a data bus DB based on data provided from the adjustment unit 24. The processor 71 controls the D/A converters 72 and 73 via control-signal lines CT. The D/A converters 72 and 73 converts the digital data supplied from the processor 71 into analog signals so as to output the step voltage Vstp and the offset voltage Voft. When this configuration is applied to detailed structures shown in FIG. 7 and FIG. 9, the D/A converter should be provided with respect to each of the step voltage Vstp1 and the step voltage Vstp2.

The adjustment unit 24, which supplies data to the processor 71, is comprised of a memory, for example, which stores a predetermined set of data. Alternately, the liquid-crystal-display device 10 may be provided with operation switches or the like for adjusting the offset voltage Voft and the step voltage Vstp, such that values indicated by the switches are converted into digital data which are then supplied to the processor 71.

Figure 17A:
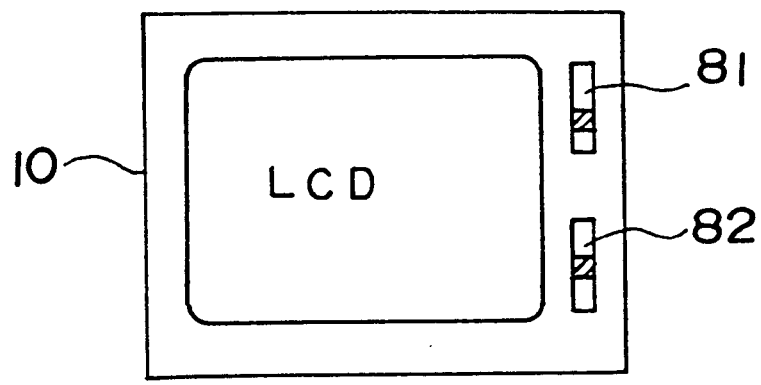
FIGS. 17A and 17B are illustrative drawing showing examples in which a user adjusts an offset voltage and a step voltage manually.
Figure 17B:
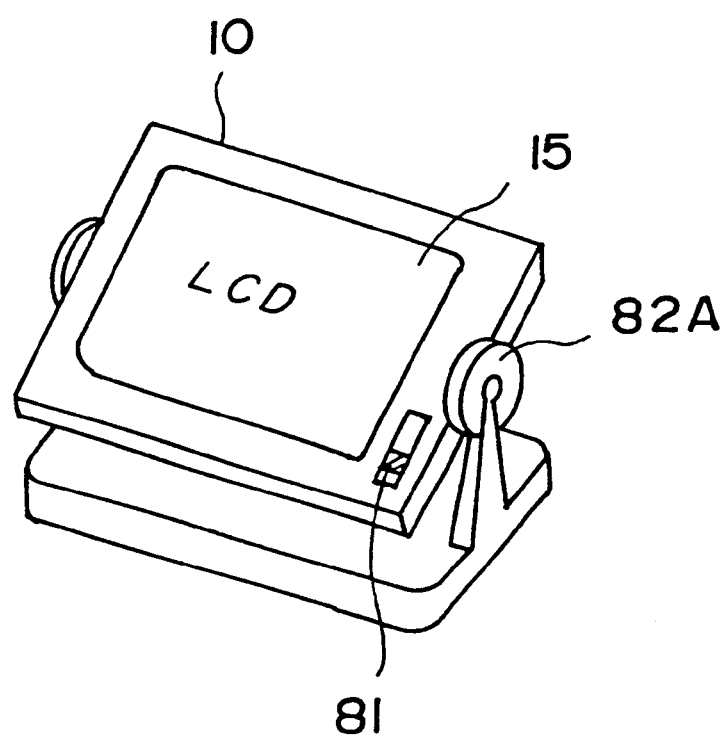

FIGS. 17A and 17B are illustrative drawing showing examples in which a user adjusts the offset voltage Voft and the step voltage Vstp manually.

FIG. 17A shows a case in which switches 81 and 82 are provided for the liquid-crystal-display device 10 so as to allow manual adjustment to be made to the offset voltage Voft and the step voltage Vstp. The switches 81 and 82 may be mechanical means such as volume switches, or may be electrical means such as those based on infrared-remote-control keys. In FIG. 17B, the offset voltage Voft is controlled by the switch 81 the same as that of FIG. 17A, whereas the step voltage Vstp is controlled by a switch 82A which is connected to and controlled by an angle-adjustment mechanism of the LCD panel 15. In either case shown in FIG. 17A or FIG. 17B, the switches 81 and 82 (or 82A) are adjusted in accordance with an angle and a distance at which the user views the LCD panel.

Values mechanically indicated by the switches 81 and 82 (or 82A) are converted into corresponding amounts of electric current or corresponding levels of electric voltage, and, then, are digitized by D/A converters. The digitized data is supplied to the processor 71.

In the examples of FIGS. 17A and 17B, a liquid-crystal-display device of a direct-view type has been shown as an example. It is-apparent, however, that similar adjustment mechanism can be provided for a liquid-crystal-display device of a projection type.

Figure 18:
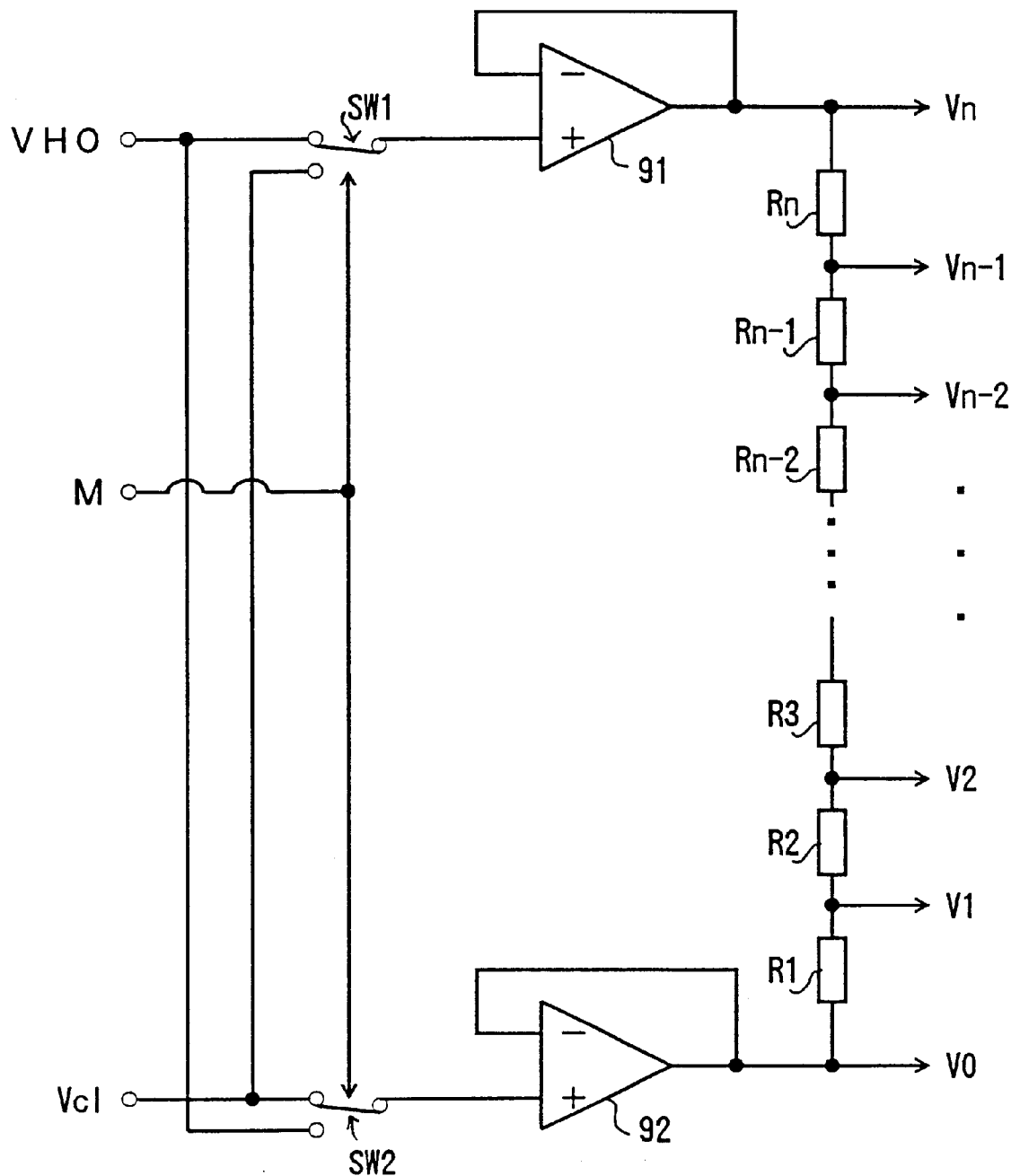

FIG. 18 is a circuit diagram showing a circuit which generates half-tone voltages based on the clamp voltage Vcl in the data driver 13 or the like.

The circuit of FIG. 18 includes differential amplifiers 91 and 92, resistors R1 through Rn together forming a resistor series, and switches SW1 and SW2. The circuit of FIG. 18 can generate half-tone voltages V0 through Vn relative to the clamp voltage Vcl and a voltage VHO higher than the clamp voltage Vcl. The half-tone voltages V0 through Vn have a higher voltage side thereof flipped over to a lower voltage side at each cycle as the switches SW1 and SW2 are connected alternatively to one of the two different voltages at each cycle. In this manner, the clamp voltage always corresponds to a black-color voltage when the video signal switches between a positive-voltage side and a negative voltage side at each cycle.

Further, the present invention is not limited to these embodiments, but various variations and modifications may be made without departing from the scope of the present invention.

What is claimed is:

1. A display device comprising:
    a display unit of a dot-matrix type, each pixel of which has view-angle-dependent characteristics; and
    a correction circuit which corrects said view-angle-dependent characteristics by changing a voltage of a video signal from a video signal source to show either a progressive step-wise increase or a progressive step-wise decrease at a start of each video-signal period which is defined as a predetermined number of one or more horizontal scan periods.

2. The display device as claimed in claim 1, wherein said display unit is a liquid-crystal-display unit of a direct-view type.

3. The display device as claimed in claim 1, wherein said display unit is a liquid-crystal-display unit of a projection type.

4. The display device as claimed in claim 1, wherein said correction circuit includes:
    a clamp-voltage-control circuit which generates a clamp voltage which follows a step voltage change by a predetermined voltage level progressively at said start of each video-signal period by starting from an initial voltage at a beginning of a vertical scan period; and
    a clamp circuit which clamps said video signal to said clamp voltage.

5. The display device as claimed in claim 4, wherein said clamp-voltage-control circuit generates said clamp voltage showing a step voltage increase as said step voltage change.

6. The display device as claimed in claim 4, wherein said clamp-voltage-control circuit generates said clamp voltage showing a step voltage decrease as said step voltage change.

7. The display device as claimed in claim 4, wherein said clamp-voltage-control circuit includes:
    a capacitor; and
    a circuit which controls a voltage charged in said capacitor based on vertical-synchronization pulses and horizontal-synchronization pulses,
    wherein said clamp voltage is generated in accordance with said voltage charged in said capacitor.

8. The display device as claimed in claim 4, wherein said clamp-voltage-control circuit changes said clamp voltage within a horizontal scan period so as to correct said view-angle-dependent characteristics in terms of a horizontal-scan direction of said display unit.

9. The display device as claimed in claim 4, wherein said clamp-voltage-control circuit generates said clamp voltage such that said clamp voltage follows said step-voltage change progressively at said start of each video-signal period as long as said each video-signal period is one of a predetermined set of horizontal scan periods among all horizontal scan periods defining one cycle of said vertical scan period.

10. The display device as claimed in claim 4, wherein said correction circuit further includes an amplitude adjustment circuit which adjusts an amplitude of said video signal according to said clamp voltage.

11. The display device as claimed in claim 4, wherein said correction circuit further includes setting unit for allowing a manual setting to be made with respect to said initial voltage and said predetermined voltage level.

12. A correction circuit for correcting view-angle-dependent characteristics of a dot-matrix-type display unit, said correction circuit comprising:
    a clamp-voltage-control circuit generating a clamp voltage which changes a voltage level thereof to show either a progressive step-wise increase or a progressive step-wise decrease at a start of each video-signal period which is defined as a predetermined number of one or more horizontal scan periods; and
    a clamp circuit which clamps a video signal from a video signal source to said clamp voltage.

13. The correction circuit as claimed in claim 12, wherein said clamp-voltage-control circuit generates said clamp voltage such that said clamp voltage follows a step voltage increase by a predetermined voltage level progressively at said start of each video-signal period by starting from an initial voltage at a beginning of a vertical scan period.

14. The correction circuit as claimed in claim 12, wherein said clamp-voltage-control circuit generates said clamp voltage such that said clamp voltage follows a step voltage decrease by a predetermined voltage level progressively at said start of each video-signal period by starting from an initial voltage at a beginning of a vertical scan period.

15. The correction circuit as claimed in claim 12, wherein said clamp-voltage-control circuit includes:
   a capacitor; and
   a circuit which controls a voltage charged in said capacitor based on vertical-synchronization pulses and horizontal-synchronization pulses,
   wherein said clamp voltage is generated in accordance with said voltage charged in said capacitor.

16. The correction circuit as claimed in claim 12, wherein said clamp-voltage-control circuit changes said clamp voltage within a horizontal scan period so as to correct said view-angle-dependent characteristics in terms of a horizontal-scan direction of said display unit.

17. The correction circuit as claimed in claim 12, further comprising an amplitude adjustment circuit which adjusts an amplitude of said video signal according to said clamp voltage.

18. A method of correcting view-angle-dependent characteristics of a dot-matrix-type display unit, said method comprising the steps of:
   a) generating a clamp voltage which changes a voltage level thereof to show either a progressive step-wise increase or a progressive step-wise decrease at a start of each video-signal period which is defined as a predetermined number of one or more horizontal scan periods;
   b) clamping a video signal from a video signal source to said clamp voltage; and
   c) displaying said video signal clamped to said clamp voltage to said dot-matrix-type display unit.

19. The method as claimed in claim 18, wherein said step a) includes the steps of:
   setting said clamp voltage to an initial voltage at a beginning of a vertical scan period; and
   increasing said clamp voltage by a step of a predetermined voltage level progressively at said start of each video-signal period.

20. The method as claimed in claim 18, wherein said step a) includes the steps of:
   setting said clamp voltage to an initial voltage at a beginning of a vertical scan period; and
   decreasing said clamp voltage by a step of a predetermined voltage level progressively at said start of each video-signal period.

21. The method as claimed in claim 18, wherein said step a) includes a step of changing said clamp voltage within a horizontal scan period so as to correct said view-angle-dependent characteristics in terms of a horizontal-scan direction of said dot-matrix-type display unit.

22. The method as claimed in claim 18, further comprising a step of adjusting an amplitude of said video signal according to said clamp voltage.

* * * * *